(12) United States Patent
Meng et al.

(10) Patent No.: US 10,355,552 B2
(45) Date of Patent: Jul. 16, 2019

(54) HIGHLY REINFORCED ELASTOMETRIC STATOR

(71) Applicant: Smith International, Inc., Houston, TX (US)

(72) Inventors: Scott Meng, Houston, TX (US); Peter T. Cariveau, Houston, TX (US)

(73) Assignee: SMITH INTERNATIONAL, INC., Houston, TX (US)

(*) Notice: Subject to any disclaimer, the term of this patent is extended or adjusted under 35 U.S.C. 154(b) by 554 days.

(21) Appl. No.: 14/775,284

(22) PCT Filed: Mar. 10, 2014

(86) PCT No.: PCT/US2014/022561
§ 371 (c)(1),
(2) Date: Sep. 11, 2015

(87) PCT Pub. No.: WO2014/164485
PCT Pub. Date: Oct. 9, 2014

(65) Prior Publication Data
US 2016/0036284 A1 Feb. 4, 2016

Related U.S. Application Data

(60) Provisional application No. 61/779,442, filed on Mar. 13, 2013.

(51) Int. Cl.
*E21B 4/02* (2006.01)
*H02K 15/02* (2006.01)
*H02K 5/08* (2006.01)
*F04C 2/107* (2006.01)
*F04C 13/00* (2006.01)
(Continued)

(52) U.S. Cl.
CPC .............. *H02K 5/08* (2013.01); *C08K 3/04* (2013.01); *E21B 4/02* (2013.01); *F04C 2/1075* (2013.01); *F04C 13/008* (2013.01); *H02K 1/12* (2013.01); *H02K 15/02* (2013.01); *F04C 2230/20* (2013.01)

(58) Field of Classification Search
CPC .......... E21B 4/02; H02K 15/02; F04C 2/1075
See application file for complete search history.

(56) References Cited

U.S. PATENT DOCUMENTS 5,554,680 A * 9/1996 Ojakaar .............. C08K 3/04
524/496
6,905,319 B2 6/2005 Guo
(Continued)

FOREIGN PATENT DOCUMENTS

JP 20070161760 A 6/2007
WO 2014164485 A1 10/2014

OTHER PUBLICATIONS

Extended European Search Report issued in related EP application 14780246.6 dated Aug. 23, 2016, 6 pages.
(Continued)

*Primary Examiner* — Matthew R Buck

(57) ABSTRACT

Elastomeric compositions containing a combination of selected carbon blacks. The resultant elastomers have improved durability and/or power generation. Such elastomers may be used in oilfield products, for example, as seals or stator liners. Methods of producing these elastomeric compositions are also disclosed.

10 Claims, 3 Drawing Sheets

(51) Int. Cl.
*C08K 3/04* (2006.01)
*H02K 1/12* (2006.01)

(56) References Cited

U.S. PATENT DOCUMENTS

| | | | |
|---|---|---|---|
| 8,197,241 B2* | 6/2012 | Robisson | F04C 2/1075 418/152 |
| 8,404,770 B2* | 3/2013 | Chorvath | C08L 83/04 524/425 |
| 2003/0143094 A1 | 7/2003 | Guo | |
| 2005/0063892 A1* | 3/2005 | Tandon | B82Y 30/00 423/449.1 |
| 2007/0011873 A1 | 1/2007 | Teale et al. | |
| 2008/0050259 A1* | 2/2008 | Hooper | E21B 4/02 418/45 |
| 2010/0006342 A1 | 1/2010 | Froehlich et al. | |
| 2012/0148432 A1* | 6/2012 | Butuc | F04C 2/1075 418/48 |
| 2014/0231148 A1* | 8/2014 | Kverel | C10M 125/22 175/320 |
| 2015/0022051 A1* | 1/2015 | Meng | F04C 2/1075 310/216.001 |
| 2015/0330537 A1* | 11/2015 | Ota | C08K 3/04 428/36.8 |

OTHER PUBLICATIONS

International Search Report for International Application No. PCT/US2014/022561 dated Jul. 11, 2014.
International Preliminary Report on Patentability issued in International Patent application PCT/US2014/022561 dated Sep. 15, 2015, 10 pages.
Written Opinion issued in International Patent application PCT/US2014/022561 dated Jul. 11, 2014, 9 pages.

* cited by examiner

HIGHLY REINFORCED ELASTOMETRIC STATOR

BACKGROUND

Moineau style hydraulic motors and pumps are employed in subterranean drilling and artificial lift applications, such as for oil and/or gas exploration. Such motors make use of hydraulic power from drilling fluid to provide torque and rotary power, for example, to a drill bit assembly. While downhole drilling motors fall into the general category of Moineau-type motors, they are often subject to greater working loads, temperatures, and more severe chemical and abrasive environments than Moineau motors and pumps used for other applications. As such, the demands on drilling motor components (e.g., rotor and stator components) may far exceed the demands on the components of other Moineau-type motors and pumps. For example, drilling motors may be subject to a pressure drop (e.g., from top to bottom across the motor) of up to 1500 psi at temperatures of up to about 200° C. Furthermore, the stator may exceed 25 feet in length; thus achieving suitable processability (e.g., flowability) in order to form via injection mold the elastomer materials tends to be difficult at such lengths. Moreover, many rubber compounds are known to deteriorate or degrade in the presence of hydrocarbons.

The power section of a Moineau style motor may include a helical rotor disposed within the helical cavity of a corresponding stator. When viewed in circular cross section, a typical stator shows a plurality of lobes in the helical cavity. In various Moineau style power sections, the rotor lobes and the stator lobes are disposed in an interference fit, with the rotor including one fewer lobe than the stator. Thus, when fluid, such as a drilling fluid, is passed through the helical spaces between rotor and stator, the flow of fluid causes the rotor to rotate relative to the stator (which may be coupled, for example, to a drill string). The rotor may be coupled, for example, through a universal connection and an output shaft to a drill bit assembly. Rotation of the rotor therefore causes rotation of the drill bit in a borehole.

One drawback with stators having an all elastomer helical cavity component is that a tradeoff in elastomer properties has been required. One such tradeoff has been between the resilience (e.g., rigidity) of the elastomer and its processability (e.g., its flowability during injection molding). For example, as discussed in U.S. Pat. No. 6,905,319, processability is generally inversely related to the stiffness of the rubber, which is particularly true in injection-mold processes. A stiffer compound may demand much more processing power and time, thereby increasing manufacturing costs. As a result, conventional wisdom in the art suggests that rigid elastomers (e.g., those having a Shore A hardness of about 90) are not suitable for use in downhole stators due to inherently poor processability, and it is preferred to use elastomeric materials in conventional stators that have a hardness (Shore A) in the range from 65-75.

One significant drawback with conventional stators is that the elastomer helical cavity component deforms under torque loads (due in part to the low rigidity of the elastomer). This deformation creates a gap on the unloaded side of the stator lobe, thereby allowing drilling fluid to pass from one cavity to the next without producing any work (i.e., without causing rotation of the rotor). This is known in the art as "RPM drop-off." When the torque reaches a critical level, substantially all of the drilling fluid bypasses the stator lobes and the rotor stalls. Thus, flexibility of the liner may lead to incomplete sealing between the rotor and stator such that available torque may be lost when the rotor compresses the stator lobe material, thereby reducing the power output of the positive displacement motor (PDM). Stiffer or harder rubbers may limit deformation, but may also restrict the sealing properties.

Additional problems may be encountered with stators when, for example, rotation of the rotor within the stator shears off portions of the stator lobes. This process, which may be referred to as "chunking," deteriorates the seal formed between the rotor and stator and may cause failure of the PDM. Chunking may be increased by swelling of the liner or thermal fatigue. Swelling and thermal fatigue may be caused by elevated temperatures and exposure to certain drilling fluids and formation fluids, among other factors.

SUMMARY OF THE DISCLOSURE

Elastomeric stators according to one or more embodiments herein may provide for a balance of hardness, stiffness, compression set, and processability. For example, stators according to one or more embodiments herein may have the advantages of low compression set and good processability, similar to a soft rubber, and may also have the advantage of a high reinforcement and durability, similar to a hard rubber. Stators according to one or more embodiments herein may also be suitable for use in high temperature drilling applications and/or in the presence of aggressive mud (such as a mud that includes particulates and other additives normally detrimental to stators).

In one aspect, one or more embodiments disclosed herein relate to a composition useful for forming a stator liner or a portion thereof, comprising a curable elastomer, a furnace carbon black, and a thermal carbon black.

In another aspect, one or more embodiments disclosed herein are directed to a method of forming a stator or a portion thereof that comprises admixing a curable elastomer, a furnace carbon black, and a thermal carbon black to form a curable composition; disposing the curable composition in a mold; and curing the curable composition to form a stator liner or portion thereof having randomly dispersed mixture of a furnace carbon black and a thermal carbon black.

In other aspects, one or more embodiments disclosed herein are directed to a stator, useful in positive displacement drilling motors, that comprises a stator liner containing at least one elastomeric layer that includes a curable composition having a randomly dispersed mixture of a furnace carbon black and a thermal carbon black.

In yet another aspect, one or more embodiments disclosed herein are directed to a drilling motor that comprises a stator and a rotor with the rotor being configured to rotate eccentrically when a drilling fluid is passed through the motor. The stator contains a stator liner with at least one elastomeric layer that includes a curable composition having a randomly dispersed mixture of a furnace carbon black and a thermal carbon black.

In another aspect, one or more embodiments disclosed herein are directed to a drilling assembly, comprising a drilling motor having a stator and a rotor configured to rotate eccentrically when a drilling fluid is passed through the motor, the stator and rotor each having a proximal end portion and a distal end portion. The stator contains a stator liner with at least one elastomeric layer that includes a curable composition having a randomly dispersed mixture of a furnace carbon black and a thermal carbon black. The drilling assembly further comprises a motor output shaft directly or indirectly coupled to the distal end portion of the rotor and a drill bit directly or indirectly coupled to a distal end portion of the motor output shaft.

In some aspects, one or more embodiments disclosed herein are directed to a method of forming a carbon black reinforced elastomeric component useful in oilfield products, such as a seal or a stator liner, comprising admixing a curable elastomer, a furnace carbon black, and a thermal carbon black to form a curable composition; disposing the curable composition in a mold; and curing the curable composition to form the carbon black reinforced elastomeric component.

In yet another aspect, one or more embodiments of the present disclosure are directed to a method of forming a carbon black reinforced elastomeric component useful in oilfield products, such as a seal or a stator liner, comprising admixing a curable elastomer, a furnace carbon black, and a thermal carbon black to form a curable composition; disposing the curable composition in a mold; and curing the curable composition to form the carbon black reinforced elastomeric component.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

In one aspect, one or more embodiments disclosed herein relate to stators used with positive displacement drilling motors. More specifically, one or more embodiments disclosed herein relate to a carbon black reinforced stator, and compositions for forming the carbon black reinforced stator. A combination of carbon black filters may be used to advantageously provide reinforcement, stiffness, processability, and other properties, exhibiting the desirable aspects of both hard and soft rubbers. The mixture of various sizes of carbon black manufactured from various processes are incorporated and well dispersed throughout the elastomeric or rubber matrix.

Figure 1:
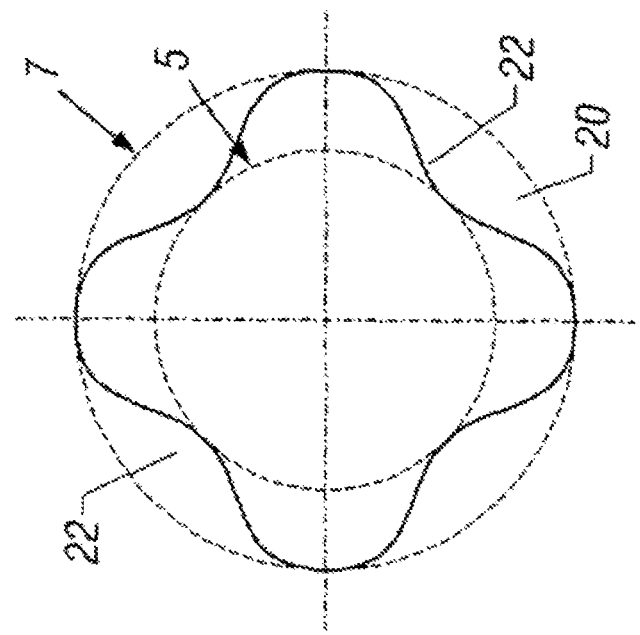
FIG. 1 shows a cross-sectional view of a rotor useful in, e.g., mud motors, according to one or more embodiments disclosed herein.

Referring to FIG. 1, a rotor 10 according to one or more embodiments herein may include at least one lobe 12 (where, for example, channels 14 are formed between lobes 12), and may have a major diameter 8 and a minor diameter 6. The rotor 10 may be formed of metal or any other suitable material. The rotor 10 may also be coated to withstand harsh drilling environments experienced downhole.

Figure 2:
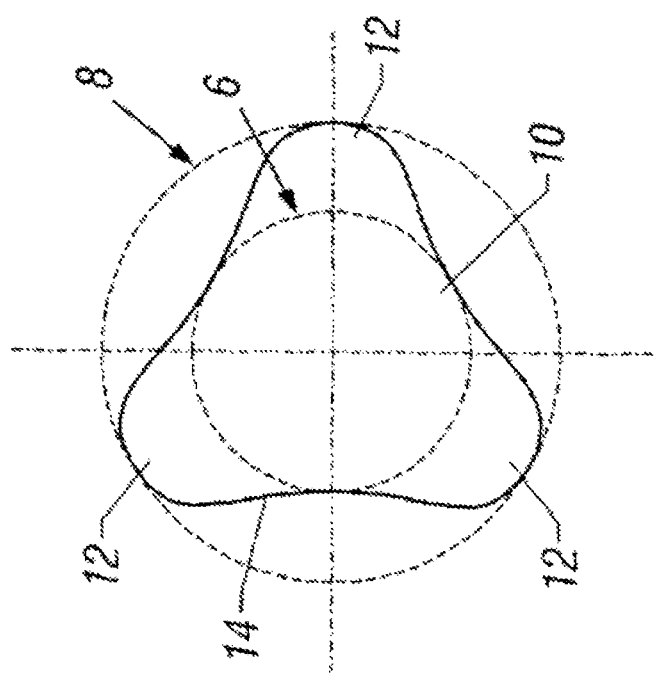
FIG. 2 shows a cross-sectional view of a stator useful in, e.g., mud motors, according to one or more embodiments disclosed herein.

Referring to FIG. 2, a stator 20 according to one or more embodiments herein may include at least two lobes 22, and may have a major diameter 7, and a minor diameter 5. Rotor 10 (FIG. 1) may include "n" lobes, and the corresponding stator 20 used in combination with the rotor 10 may include either "n+1" or "n−1" lobes.

Figure 3:
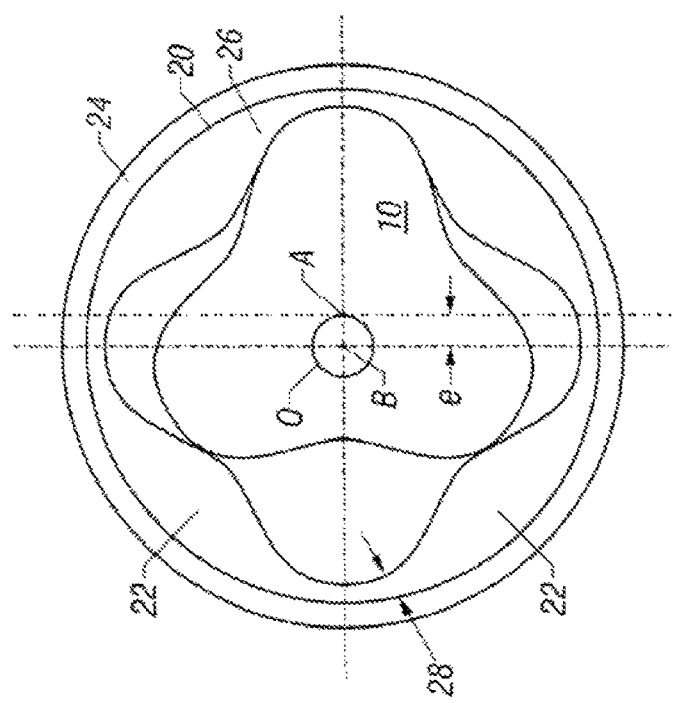
FIG. 3 shows a cross-sectional view of an assembled positive displacement motor according to one or more embodiments disclosed herein.

Referring to FIG. 3, a cross-sectional view of an assembled positive displacement motor (PDM), including a stator 20 according to one or more embodiments disclosed herein, is illustrated. Stator 20 may include a cylindrical external tube 24 (may also be referred to as a housing) and a liner 26.

Liner 26 may be injected or extruded into cylindrical external tube 24 around a mold (not shown) that has been placed therein. Liner 26 is then cured for a selected time at a selected temperature (or temperatures) before the mold (not shown) is removed. A thickness 28 of liner 26 may be controlled by changing the dimensions of the mold (not shown). A curing pressure, temperature, and time may be selected using means know in the art so as to completely cure the elastomer. After completion of the curing process, the stator will be returned to normal atmospheric conditions. Final machining may be required to complete the stator (e.g., end portions of the liner may need to be trimmed, end portions of the stator may be threaded, etc.). A rotor 10 may then be disposed within the stator to complete assembly of the positive displacement motor.

As shown in FIG. 3, rotor 10 may have an longitudinal axis "A." Stator 20 may have a longitudinal axis "B." Rotor 10, in operation, rotates eccentrically within stator 20 along an orbital path "O" having a radius of eccentricity "e."

As illustrated in FIG. 3, liner 26 has a non-uniform thickness. In other embodiments, "even-wall" stators may be formed using carbon black reinforced compositions disclosed herein, such as illustrated in FIG. 4.

Figure 4:
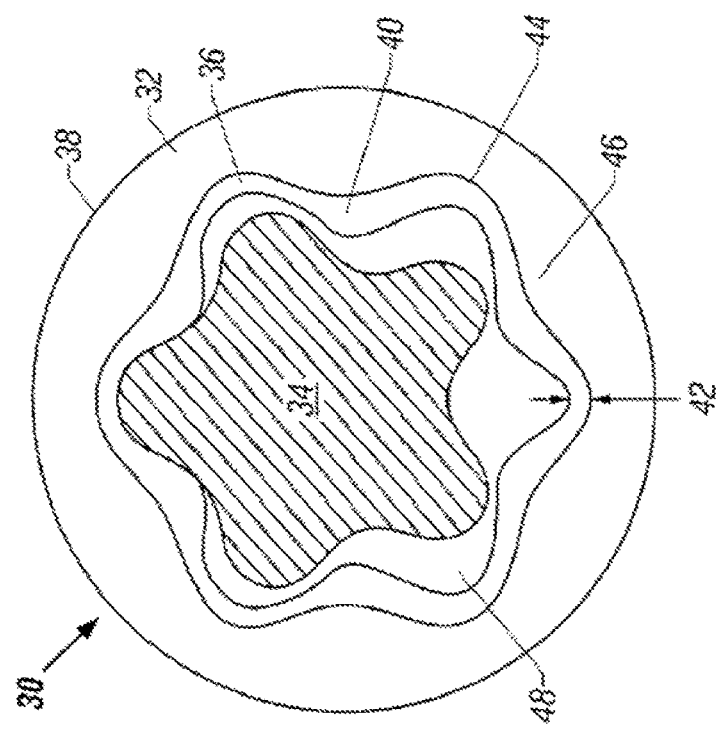
FIG. 4 shows a cross-sectional view of an assembled positive displacement motor according to one or more embodiments disclosed herein, having an "even-wall" stator liner.

Referring to FIG. 4, a cross-sectional view of an assembled positive displacement motor 30, having an "even-wall" stator liner according to one or more embodiments herein, is illustrated. Positive displacement motor (PDM) 30 may include a stator 32 and a rotor 34.

Stator 32 may include a housing 38 that may be formed from, for example, steel or another material suitable for downhole use in a drilling environment. Stator 32 also includes a liner 36. Housing 38 may have a shaped inner surface 44 that includes at least two lobes 46 formed thereon and channels 48 therebetween.

Lobes 46 may be formed along a selected length of the housing 38 so that lobes 46 define a helical pattern along the selected length. The helical form of the inner surface 44 generally corresponds to a desired shape for stator lobes 46.

Liner 36 may include at least two lobes 40, and a thickness 42 of the liner 36 may be either uniform or non-uniform throughout a cross-section thereof. Line 36 may be formed by injection molding, extrusion molding or other means followed by curing and finishing, as noted above. Lobes 40 (and liner 36) are helically formed along a selected length of housing 38 such that liner 36 conforms to the helically shape of inner surface 44 so that the at least two lobes 46 formed on the shaped inner surface 44 correspond to lobes 40 formed in liner 36. Housing 38, including the inner surface 44, may be helically shaped by any means known in the art including molding, machining, hydroforming, extrusion, and the like.

Stator liners according to one or more embodiments disclosed herein may be formed from an elastomeric or polymeric matrix material reinforced or cured with a selected mixture of carbon black materials. In other embodiments, stator liners may include a composite structure, such as an elastomeric or hard rubber layer and one or more layers including an elastomeric or polymeric matrix material reinforced or cured with a selected mixture of carbon black materials according to one or more embodiments herein. The layer including the elastomeric or polymeric matrix material reinforced or cured with a selected mixture of carbon black materials may be proximate the housing, intermediate the external tube (housing) and an elastomeric outer layer, or may be used as the elastomeric outer layer. The layer(s) including the elastomeric or polymeric matrix material reinforced or cured with a selected mixture of carbon black materials may provide desired properties, such as stiffness and/or wear resistance, to the liner.

Stator liners, portions of stator liners, or reinforcing layers thereof, may be formed from a composition including a curable or cross-linkable elastomeric or polymeric material, such as various elastomers, polymers, and other synthetic or natural materials known in the art; and a mixture of selected carbon black materials, such as a mixture of furnace blacks and thermal blacks. The compositions used to form stator liners or portions thereof may also include plasticizers, curatives (i.e., curing or crosslinking agents), activators, processing aids, and waxes, among other additives.

Curable or cross-linkable elastomeric or polymeric materials may include, for example, G.R.S., neoprene, butyl and nitrile rubbers, fluorinated or perfluoro elastomers or rubbers, and soft PVC, among other polymers. In one or more embodiments, the elastomeric stator may be formed from elastomeric or rubber materials such as acrylonitrile polymers including acrylonitrile-butadiene rubber (NBR), hydrogenated nitrile-butadiene rubber (HNBR), carboxylated acrylonitrile butadiene, carboxylated hydrogenated acrylonitrile butadiene, ethylene propylene, ethylene propylene diene, fluoroelastomers including those available under the trade names VITON® and KALREZ® manufactured by DuPont, tetrafluoroethylene-propylene copolymers (FEPM) (available under the trade name AFLAS® from Asahi Glass Co.), fluorocarbon (FKM) and perfluoroelastomer (FFKM), and the like.

Other components that may be used in the curable or cross-linkable elastomeric or polymeric materials include activators or accelerators for the curing, mold release agents, such as stearic acid, zinc oxide and curing agents, and agents that improve the heat resistance of the polymer, such as antioxidants and anti-ozonants. Other additives that may affect the material properties of the cured polymer may also be used, such as carbon nanotubes, carbon fibers, nano-sized polytetrafluoroethylene (PTFE), or silica- or silicate-containing materials such as mica or diatomaceous earth.

In some embodiments, the elastomeric compound may include mixtures of elastomers selected from the group of NBR, HNBR, FEPM, FKM, and FFKM.

In some embodiments, the elastomeric material may include a hydrogenated copolymerization product of 1,3-butadiene and acrylonitrile having a Mooney Viscosity ML(1+4) at 121° C. in the range from about 20 to about 120. The acrylonitrile content may be in the ranges from about 19 wt % to about 49 wt %, and the hydrogenation may be full or partial, leaving a residual double bond content from less than 1% to about 18%. In some embodiments, the specific gravity may be in the range of 0.95 to 1.19 g/cm$^3$.

In other embodiments, the elastomeric material may include a copolymer of vinylidene fluoride and hexafluoropropylene having a Mooney Viscosity ML(1+10) at 100° C. in the range from about 10 to about 160. In some embodiments, the fluorine content of the elastomeric material may be in the range from about 60% to about 70%.

Elastomeric materials may also include a copolymer of vinylidene fluoride, hexafluoropropylene, and tetrafluoroethylene, with or without a cure site monomer, having a Mooney Viscosity ML(1+4) at 121° C. in the range from about 25 to about 65.

In other embodiments, the elastomeric material may include a copolymer of tetrafluoroethylene and propylene, with or without a cure site monomer, having a Mooney Viscosity ML(1+4) at 100° C. in the range from about 35 to about 160. In some embodiments, the fluorine content of the elastomeric material may be in the range from about 55% to about 65%.

The aforementioned polymers may be used alone or in combination with one or more additional polymers or grades of a similar polymer at a ratio in the range from about 5:95 to about 95:5, from about 10:90 to about 90:10, or from about 20:80 to about 80:20.

The above described elastomeric or polymeric matrix materials may be reinforced or cured with a selected mixture of carbon black materials to form stator liners or portions of stator liners according to one or more embodiments herein. Carbon blacks useful in one or more embodiments herein are in the form of a fine powder that possesses a large surface area and is composed essentially of elemental carbon. On a molecular level, the carbon black may be composed of amorphous graphitic layers formed from a continuous planar arrangement of aromatic rings.

Depending on the method of manufacture, the physical and chemical properties of carbon black can vary significantly. Stator liners herein synergistically use selected carbon blacks to achieve a balance of desired properties in the resulting stator liner. For example, a mixture of carbon blacks useful in forming stator liners according to one or more embodiments herein may include a furnace black, such as a carbon black selected from the N500 series, and a thermal black, such as a carbon black selected from the N900 series.

Furnace blacks may be made from incomplete combustion of hydrocarbons, usually petroleum oil or tar as feedstock, and may contain an aggregate microstructure that increases the surface area of the particles and varies with series number. For example, the surface area of furnace blacks useful in one or more embodiments herein may be in the range from about 27 m$^2$/g to about 145 m$^2$/g. Because furnace blacks may be formed quickly from incomplete combustion products, the surface of the individual particles contains a high density of chemically-reactive non-aromatic carbon that may form covalent bonds to the surrounding rubber. In addition to reactive carbon, the surface of furnace black may also contain numerous types of organic functional groups such as phenols, hydroxyls, lactones, quinones, that may also contribute to the chemical reactivity of the furnace black. In contrast, thermal blacks useful in one or more embodiments herein may be formed from thermal degradation of natural gas (e.g., methane and other light hydrocarbons) under high temperatures, such as up to 1200-1300° C. Thermal black is formed over a longer time scale and at higher temperature than furnace black, resulting in a carbon black particle that is highly ordered and predominantly spherical. Because of the ordered structure, thermal black has fewer non-aromatic carbon "active sites" to bond with the surrounding rubber, resulting in a rubber that is substantially more soft and ductile.

Curable or cross-linkable elastomeric or polymeric materials may thus be mixed with a mixture of selected carbon blacks to result in desired properties upon cure of the elastomeric or polymeric material. For example, when added to rubber compositions, furnace black may advantageously increase reinforcement and stiffness of the rubber composition, resulting in a harder rubber having a high compression set value, increasing the composition's resistance to deformation; synergistically, the thermal black may be used to lower viscosity and compression set value and enhance processability and improve dynamic properties. In this manner, the synergistic mixture may avoid the decreased ability of the composition to properly seal against the rotor during operation, as may occur through use of furnace blacks alone.

Dibutyl phthalate (DBP) absorption measures the relative structure of carbon black by determining the amount of DBP a given mass of carbon black can absorb before the resulting paste reaches a specified viscosity paste. The DBP absorption of furnace blacks useful in one or more embodiments herein may be in the range from about 30 mL/100 g to about 180 mL/100 g, such as from about 65 to about 180 ml/100 g. Thermal blacks useful in one or more embodiments herein may have a DBP absorption numbers in the range from about 25 mL/100 g to about 45 ml/100 g, such as about 32 to about 45 ml/100 g.

The average particle diameter of furnace blacks useful in one or more embodiments herein may be in the range from about 30 nm to about 150 nm. The average particle diameter of thermal blacks useful in one or more embodiments herein may be in the range from about 250 to about 350 nm, such as about 300 nm.

The selected mixture of furnace black and thermal black may be used to create an elastomeric compound having improved durability and/or power generation. In some embodiments, the ratio of the furnace black to the thermal black may be in the range from about 0.009:1 to about 1.5:1. In other embodiments, the ratio of furnace black to thermal black may be in the range from about 0.045:1 to about 0.5:1.

Stator liners according to one or more embodiments herein may thus include a curable or cross-linkable elastomeric or polymeric matrix material in combination with a mixture of selected carbon blacks, which may be present in an amount ranging from about 1 to about 1000 phr (parts per hundred parts curable or cross-linkable elastomer or polymer). For example, a stator liner may include an HNBR matrix material in combination with a furnace carbon black and a thermal carbon black, where the furnace carbon black is present in an amount ranging from about 10 parts per hundred parts curable elastomer (phr) to about 100 phr, and the thermal carbon black is present in an amount ranging from about 10 phr to about 100 phr.

In some embodiments, the furnace carbon black may be N550 carbon black, having an average particle size of 60 nm, a surface area of about 40 $m^2/g$, and a DBP absorption number in the range from about 121 ml/100 g.

In some embodiments, the thermal carbon black may be N990 carbon black, having an average particle size of 280 nm, a surface area of about 9 $m^2/g$, and a DBP absorption number about 43 ml/100 g.

As noted above, the compositions disclosed herein may also contain plasticizers, curatives (i.e., curing or crosslinking agents), activators, amorphous silicon dioxide, processing aids, and waxes.

In other embodiments, the elastomeric stators may also include a fibrous component, which aids in reinforcement and stability of the stator, such as those described in U.S. patent application No. 61/601,445.

Fiber or fibrous material may include at least one of carbon fibers, boron fibers, ceramic fibers, glass fibers, thermoplastic fibers, natural fiber, metallic fibers, synthetic fibers, and/or carbon nanotubes. For example, in some embodiments, the fibers may include fibers made from E-glass, polyethylene, polyethyleneimine, polyvinylidene chloride, polytetrafluoroethylene, polyvinyldienefluoride, polyvinylfluoride, polyetheretherketone, polyphenylene sulfide, and/or co- or ter-polymers thereof. In some embodiments, the fiber or fibrous material may include aramid fibers, such as those sold under the mark "KEVLAR" (a mark of E.I. Dupont de Nemours of Wilmington, Del.).

In some embodiments, incorporation of the fiber into the curable composition mixture may be facilitated by use of a predispersion of fiber in a fiber dispersion compound. For example, a mixture of 10 wt. % to about 70 wt. % fiber in 90 wt. % to about 30 wt. % fiber dispersion compound may be admixed with an elastomeric material prior to injection or extrusion molding of the curable composition in a mold.

The above described compositions may be formed using a screw mixer, a blending mill, an internal mixer (e.g., a BANBURY® mixer), a single or multiple screw extruder, or other mixing devices as known in the art for intimately mixing a polymeric or elastomeric resin material with one or more additive compounds, including the selected carbon blacks. The mixing process may further provide heat, melting the polymeric or elastomeric resin material during the mixing process, and the resulting fluid mixture may then be extruded, injected, or otherwise disposed between a stator tube (housing) and a mold that has been placed therein. In some embodiments, the carbon black may be introduced to the matrix material in the form of a predispersion. The liner material may then be cured and the stator finished (trimming, threading, etc.), as described above.

As noted above, elastomeric compositions disclosed herein may provide for improved processability using injection molding tooling. For example, NBR, HNBR, and other elastomeric compounds having a Mooney Viscosity ML(1+4) at 121° C. in the range from about 25 to about 40, and in some embodiments up to about 50, may be used when forming the stator via injection molding equipment typically used to produce stators having a length in the range from about 10 to about 25 feet (from about 3 to about 7.5 meters). Compositions useful with extrusion molding may include elastomeric compounds having a Mooney Viscosity ML(1+4) 100° C. in the range from about 25 to about 65, and in some embodiments up to about 80. Compositions useful with compression molding may include elastomeric compounds having a Mooney Viscosity ML(1+4) 100° C. in the range from about 25 to about 90, and in some embodiments up to about 120. Compositions useful with transfer molding may include elastomeric compounds having a Mooney Viscosity ML(1+4) 100° C. in the range from about 20 to about 45.

The above described stators may be employed in a mud motor or drilling assembly used for the drilling of a bore, wellbore or tunnel through a subterranean formation. A lower end portion of the rotor may be coupled either directly or indirectly to, for example, a drill bit. In this manner, the PDM provides a drive mechanism for a drill bit independent of any rotational motion of a drill string generated proximate the surface of the well by, for example, rotation of a rotary table or top drive associated with a drilling rig. Accordingly, PDMs are especially useful in drilling directional wells where a drill bit is connected to a lower end portion of a bottom hole assembly (BHA). The BHA may include, for example, a PDM, a transmission assembly, a bent housing assembly, a bearing section, and/or the drill bit. The rotor may transmit torque to the drill bit via a drive shaft or a series of drive shafts that are operatively coupled to the rotor and to the drill bit. In operation, a drilling fluid is passed through the mud motor assembly, eccentrically rotating the rotor as the drilling fluid passes through the progressive cavity motor. The motor output shaft transmits the eccentric rotor motion (and torque) to the concentrically rotating drill bit to drill into the formation.

EXAMPLES

In the following Examples, stator liners are formed via injection molding of an elastomeric matrix material admixed with various additives between a housing and a mold. The elastomeric materials were then cured to form the stator with the stator liner. The housing and mold were identical for each example, thus providing a consistent comparative basis.

Test samples formed for the respective property analyses were according to the noted ASTM or other industry accepted test methods shown in Table 1.

TABLE 1

| Property | Test Method |
| --- | --- |
| Hardness (Shore A) | D412-06 |
| 300% Modulus | D2240-05 |
| Mooney ML (1 + 4) at 250° F. | D1646-07 |
| Heat Aging | D573-04 |
| Oil Immersion | D471-10 |
| Compression Set | D395-03 |

Sample 1

A stator liner was formed using an HNBR in combination with a thermal black and a furnace black according to the formulation listed in Table 2. Lab samples were press-cured for 45 minutes under 150° C. Sample stators were injection-molded and subsequently cured in the steam autoclave for 3.5 hours under 150° C.

Comparative Sample 2

A stator liner was formed using an HNBR according to the formulation listed in Table 2. Lab sample was press-cured for 45 minutes under 150° C. Sample stators were injection-molded and subsequently cured in the steam autoclave for 3.5 hours under 150° C.

Comparative Sample 3

A stator liner was formed using an HNBR according to the formulation listed in Table 2. Lab sample was press-cured for 45 minutes under 150° C. Sample stators were injection-molded and subsequently cured in the steam autoclave for 3.5 hours under 150° C.

Comparative Sample 4

A stator liner was formed using an HNBR according to the formulation listed in Table 2. Lab samples were press-cured for 45 minutes under 150° C. Sample stators were injection-molded and subsequently cured in the steam autoclave for 3.5 hours under 150° C.

TABLE 2

| Sample | Sample 1 (phr) | Comparative Sample 2 (phr) | Comparative Sample 3 (phr) | Comparative Sample 4 (phr) |
| --- | --- | --- | --- | --- |
| HNBR Polymer | 100 | 100 | 100 | 100 |
| Blends of Furnace black N550 and Thermal black N990 | 70 | — | — | — |
| Straight Furnace black 1 N774 | — | 70 | 90 | — |
| Straight Furnace black 2 N660 | — | — | — | 70 |
| Activator | 6 | 6 | 6 | 6 |
| Process aid | 10 | 10 | 10 | 10 |
| Plasticizer | 15 | 15 | 15 | 15 |
| Curatives | 8 | 8 | 8 | 8 |
| Hardness | 75 | 75 | 90 | 75 |

Stators from Sample 1 and Comparative Samples 2-4 were analyzed for pump performance and endurance.

Pump Performance

Figure 5:
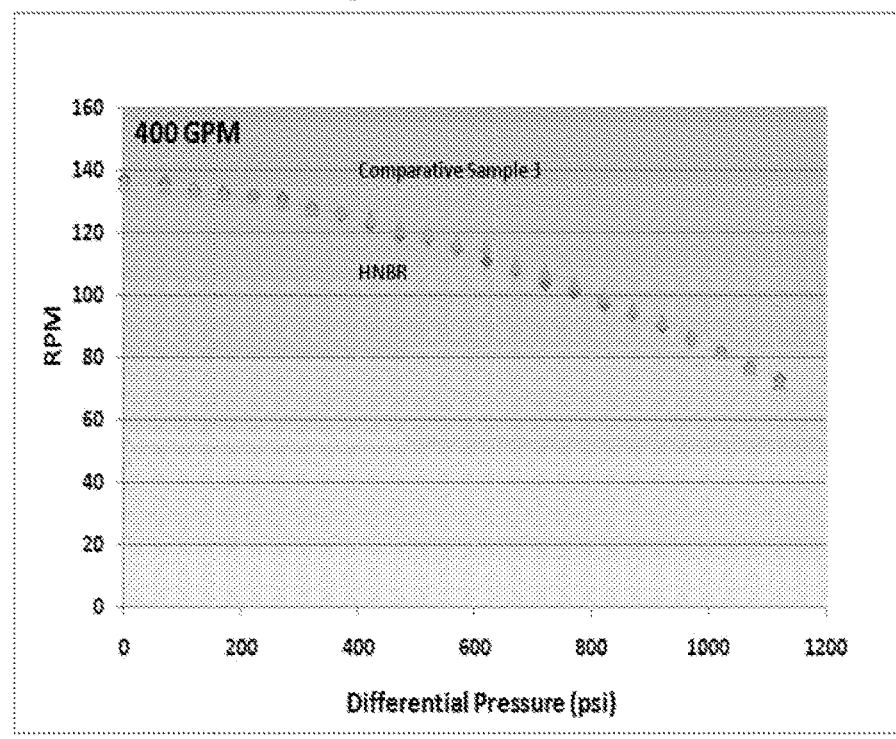
FIGS. 5 and 6 compare the performance of a positive displacement motor according to one or more embodiments herein, including a selected mixture of carbon blacks, to that for a positive displacement motor formed without the selected mixture of carbon blacks.
Figure 6:
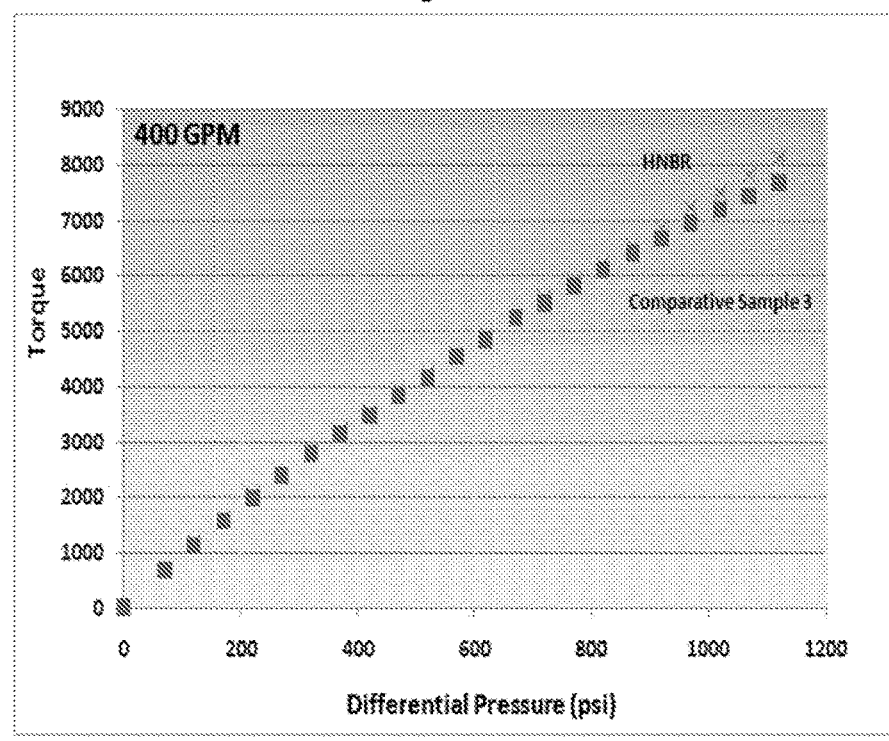

The performance of a mud motor including a stator formed using a liner formed from the material of Sample 1 was compared to that for a motor including a stator formed from the material of Comparative Sample 4. The pump performance was measured at a mud flow rate of 400 gpm over differential pressures up to about 1150 psi. The test results are shown in FIGS. 5 and 6. As shown, the stator formed with an HNBR matrix material reinforced with thermal black and furnace black has equal, if not better, performance to the stator formed from Comparative Sample 3.

Endurance Test

The performance of the stator was also analyzed using an endurance test, where the stator liners were subjected to a series of pressure drops (approximate average of 275 psi/stage). Test results are shown in Table 3.

TABLE 3

| Endurance Test (400 gpm) 275 psi/stage average | Sample 1 | Comparative Sample 2 | Comparative Sample 3 |
| --- | --- | --- | --- |
| Total Hours | 60 | 20 | 60 |

As shown by the Endurance test results, the stator liner formed with an HNBR matrix material reinforced with thermal black and furnace black (Sample 1) has equal, if not better, performance to the stators formed from the hard rubber (Comparative Sample 3).

The stator liner composition of Sample 1 was also compared to the stator liner composition of Comparative Sample 3 for heat aging, oil immersion, and compression set properties. The results are shown in Table 4.

TABLE 4

| D5703-4 Heat Aging | Sample 1<br>70 hours at 150° C. | Comparative Sample 3<br>70 hours at 121° C. |
|---|---|---|
| Tensile loss % | 14 | 15 |
| Elongation loss % | −34 | −75 |
| Hardness Change | 8 | 7 |
| D471-10 ASTM#3 Oil Immersion | 70 hours at 150° C. | 70 hours at 150° C. |
| Tensile loss % | 5 | −15 |
| Elongation loss % | −5 | −55 |
| Hardness Change | −3 | 4 |
| D395-03 Compression Set (Method B) | 70 hours at 121° C. | 70 hours at 121° C. |
| % | 20 | 75 |

As shown by the comparison of properties in Table 4, the stator formed with an HNBR matrix material reinforced with thermal black and furnace black (Sample 1) has much better temperature and fluid/mud resistance, as well as a lower compression set, as compared to stators formed from a hard rubber (Comparative Sample 3, Table 3).

Comparison with N600 Carbon Black Containing Stator

Properties of the composition of Sample 1 were also compared to those for composition including N600 series carbon black (Comparative Sample 4). The properties of the compositions are shown in Table 5.

TABLE 5

| Test | Sample 1 | Comparative Sample 4 |
|---|---|---|
| Hardness (Shore A) | 75 | 75 |
| 300% Modulus (psi) | 2000 | 2100 |
| Mooney ML(1 + 4) at 250° F. | 33 | 48 |

As shown in Table 1, compositions useful in stators according to one or more embodiments herein (Sample 1) may have a comparable hardness, a lower modulus, and significantly lower viscosity (greatly improved processability). Thus, the selected combination of thermal black and furnace black may provide a desirable balance among reinforcement, viscosity, and hardness, such as achieving an equivalent level of reinforcement with a lower viscosity.

As described above, one or more embodiments disclosed herein provide for uniformly dispersing mixtures of carbon black in an elastomeric matrix, disposing the mixture within a stator mold, and curing or cross-linking the elastomeric material to form a stator liner. In addition to the above noted advantages with respect to improved processability in the manufacture of stators, one or more embodiments disclosed herein may also provide for mud motors having improved durability and/or power generation. For example, the mixture of carbon black may serve to strengthen and stiffen the elastomer of the stator so that it is better able to withstand a certain amount of degradation in properties without failure or chunking and/or may be able to operate with less interference with the rotor without leakage.

An optimal balance of properties has been achieved in the development of HNBR elastomers for stators of downhole drilling mud motor that combines both reinforcement and processability by using a unique blend of furnace carbon blacks and thermal carbon blacks. The unique combination of furnace carbon blacks and thermal carbon blacks gives good tensile and elongation, high stiffness, low compression set, low hysteresis, high dynamic fatigue performance, while still retaining the ability to be injection molded In addition to stator manufacture, one or more compositions disclosed herein may also be useful for manufacturing carbon black reinforced seals and other carbon black reinforced oilfield equipment. Accordingly, seals, stator liners, and other oilfield products or portions or reinforcing layers thereof, may be formed according to one or more embodiments disclosed herein using a composition including a curable or cross-linkable elastomeric or polymeric material, such as various elastomers, polymers, and/or other synthetic or natural materials known in the art; and mixtures varying sizes of carbon black. When the mixture of thermal blacks and furnace blacks are used for seals and other oilfield products, the admixture of carbon blacks may be present in an amount ranging from about 1 phr to about 1000 phr, such as in the range from about 3 phr to about 10 phr.

Although only a few example embodiments have been described in detail above, those skilled in the art will readily appreciate that many modifications are possible in the example embodiments without materially departing from this disclosure. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function treatment for any limitations of any of the claims herein, except for those in which the claim expressly uses the words 'means for' together with an associated function.

What is claimed is:

1. A drilling assembly comprising:
   a drilling motor having a stator and a rotor configured to rotate eccentrically within the stator when a drilling fluid is passed through the drilling motor, the stator and the rotor each having a proximal end portion and a distal end portion, wherein the stator contains a stator liner with at least one elastomeric layer that includes a composition of a curable elastomer, a first carbon black, and a second carbon black, the first carbon black being a furnace carbon black and the second carbon black being a thermal carbon black;
   a motor output shaft directly or indirectly coupled to the distal end portion of the rotor; and
   a drill bit directly or indirectly coupled to a distal end portion of the motor output shaft.

2. The drilling assembly of claim 1, wherein the furnace carbon black has an average particle diameter in the range from about 15 nm to about 100 nm and the thermal carbon black has an average particle diameter in the range of 250 nm to 350 nm.

3. The drilling assembly of claim 1, wherein the furnace carbon black has a dibutyl phthalate(DBP) absorption in the range of about 30 mL/100 g to about 180 mL/100 g and the thermal carbon black has a DBP absorption in the range of about 25 mL/100 g to about 45 mL/100 g.

4. The drilling assembly of claim 1, wherein the curable elastomer comprises at least one of acrylonitrile-butadiene rubber (NBR), hydrogenated nitrile-butadiene rubber (HNBR), fluorocarbon (FKM), tetrafluoroethylene-propylene copolymers (FEPM), or perfluoroelastomer (FFKM).

5. The drilling assembly of claim 1, wherein the curable elastomer comprises from about 1 to about 1000 phr of the furnace carbon black and thermal carbon black, where phr is defined as parts per hundred parts curable elastomer.

6. The drilling assembly of claim 1, wherein the composition further comprises at least one of carbon fibers, boron fibers, ceramic fibers, glass fibers, thermoplastic fibers, natural fiber, metallic fibers, or synthetic fibers.

7. The drilling assembly of claim 1, wherein the curable elastomer comprises at least one of NBR or HNBR and has a Mooney Viscosity (ML(1+4) at 121° C.) in the range from about 20 to about 120.

8. The drilling assembly of claim 1, wherein the composition comprises:
   from about 75 to about 99 wt % curable elastomer;
   from about 10 to about 100 phr of the furnace carbon black; and
   from about 10 to about 100 phr of the thermal carbon black, where phr is defined as parts per hundred parts curable elastomer.

9. The drilling assembly of claim 1, wherein the first carbon black and the second carbon black has discrete material qualities, the first carbon black having a first ASTM designation of N550 and the second carbon black having a second ASTM designation of N990.

10. The drilling assembly of claim 1 including from about 3 to about 10 phr of the furnace carbon black and thermal carbon black, where phr is defined as parts per hundred parts curable elastomer.

* * * * *